April 28, 1970 D. L. JOHNSON 3,508,941
METHOD OF PREPARING POLYMERS FROM A MIXTURE OF CYCLIC
AMINE OXIDES AND POLYMERS
Original Filed Sept. 2, 1966
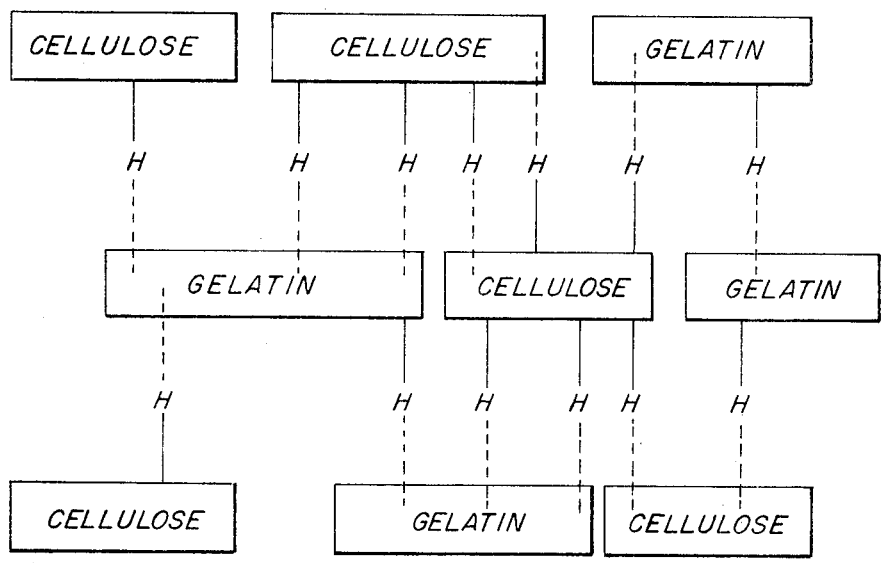
DEE L. JOHNSON
INVENTOR.
BY
ATTORNEY United States Patent Office 3,508,941
Patented Apr. 28, 1970

3,508,941
METHOD OF PREPARING POLYMERS FROM A MIXTURE OF CYCLIC AMINE OXIDES AND POLYMERS
Dee Lynn Johnson, St. Paul, Minn., assignor to Eastman Kodak Company, Rochester, N.Y., a corporation of New Jersey
Continuation of application Ser. No. 576,902, Sept. 2, 1966. This application Jan. 13, 1969, Ser. No. 790,585
Int. Cl. C08b 23/00, 25/00; C08h 7/00
U.S. Cl. 106—125                                                18 Claims

ABSTRACT OF THE DISCLOSURE

Polymeric compositions comprising at least two different polymers which have been contacted with a cyclic mono(N-methylamine-N-oxide) compound and then precipitated. In one aspect, the new compositions have a lower solubility in water than an admixture of the polymeric compounds contacted with said cyclic amine oxide.

---

This application is a continuing application of U.S. Ser. No. 576,902 filed Sept. 2, 1966, now abandoned.

This invention relates to new polymer compositions and to processes for making them.

When two or more polymers are dissolved together in a common solvent, a new resin composition may be formed by one of several phenomena, for example, (1) the different polymer constituent may react chemically, e.g., by addition, condensation, etc., to form a larger molecule which may be called an interpolymer of the individual polymers, or (2) coprecipitation of two or more polymers together from a common solvent, e.g., by removing the solvent or by adding a coprecipitating agent such as a mutual nonsolvent, forming a solid or liquid solution which consists of a single-phase molecular dispersion (solution) of the constituent polymers in each other. The variety of new compositions which can be created by such processes is limited by the range of solvents available that will dissolve all of the desired polymer constituents. Chemical reaction of the constituent polymers to form a new copolymer produces a new compound which in most cases has physical properties very different from either of its constituents and which seldom possesses the original properties of the constituents. Polymers formed as fluid or liquid dispersions of constituent polymers in each other will in most cases have physical properties that result from modification by each constituent of properties of the other. By using saturated cyclic amine oxides as solvents for difficultly soluble constituent polymers, I have made a new class of polymers consisting of different constituent polymer molecules interjoined by strong interpolymer hydrogen bonding. These new polymers exhibit some unexpected new properties and also retain some properties of the individual constituent polymers.

It is an object of this invention to provide new polymer compositions, and processes for making them.

Another object is to provide new films and fibers made with the novel polymer compositions.

These and other objects and advantages will be apparent from the following detailed description and claims, with reference to the attached drawings.

In the drawings, FIGURE 1 is a schematic representation of the proposed intermolecular structure of a polymer of the invention.

According to my invention, it has been found that new polymer compositions are produced by first contacting and preferably dissolving at least two different polymers in a cyclic mono(N-methylamine-N-oxide) compound having the formula:

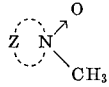

where Z represents the atoms required to complete a saturated heterocyclic ring and then precipitating the polymers together, thereby causing molecules of the different polymers to combine as a random copolymer bonded by strong interpolymer hydrogen bonding between the constituent polymer molecules. Among the preferred amine oxides useful as solvents for the constituent polymers are N-methylmorpholine - N - oxide, N-methylpiperidine-N-oxide, N-methylpyrrolidine-N-oxide and N-methylazacycloheptane-N-oxide. Generally, the different polymers contacted with the cyclic amine are characterized by hydrogen bonding groups.

One embodiment of this invention relates to new compositions of matter comprising at least two different polymeric materials which have been dissolved with a cyclic mono(N-methylamine-N-oxide) compound and then precipitated, wherein said new composition of matter has a lower solubility in water than an admixture of said polymeric compounds.

The constituent polymers may be chosen from a wide range of natural and synthetic polymers. One of the constituent polymers will be selected from polymers having the capacity for every strong intermolecular hydrogen bonding, while the remaining polymer constituents may have the same capacity or may be selected from polymers having less but at least some capacity for intermolecular hydrogen bonding. Polymers which can be used as constituent polymers in the new compositions of the invention generally contain atoms from Groups V–A or VI–A of the Periodic Table and preferably they contain nitrogen atoms such as in amine or amide groups and/or oxygen atoms such as in carbonyl groups, hydroxyl groups, ether groups and the like. Typical preferred polymers containing oxygen atoms include poly(vinyl acetates), poly(vinyl alcohols), poly(esters) and poly(saccharides) such as cellulose, starch, poly(anhydroglucose), poly(diethylaminoethylanhydroglucose), gum arabic and the like. Typical preferred polymers containing nitrogen atoms include poly(amides), poly(vinyl pyrrolidones) and polymeric proteins or poly(peptides) such as wool, silk, gelatin, hair and the like. Cellulose is especially preferred in one embodiment as one of the constituent polymers. New polymers may be made from cellulose and another constituent polymer which, for example, might be gelatin, starch, poly(vinyl alcohol), poly(vinyl pyrrolidone), poly(vinyl acetate), gum arabic, poly(anhydroglucose), poly(diethylaminoethylanhydroglucose) and the like.

Methods of precipitating the dissolved constituent polymers together include evaporating the solution to remove the solvent or adding the solution to a liquid which is a nonsolvent for the coprecipitating polymers and is a solvent for the amine oxides.

In order to reduce the viscosity of the solution containing the constituent polymers, a diluent may be added. The diluent may be used to dissolve one of the constituent polymers before it is added to the solution of another polymer dissolved in an amine oxide, or the diluent may be added to a solution which already comprises two or more constituent polymers dissolved in an amine oxide. Useful diluents include dimethyl sulfoxide, N-methylpyrrolidone, sulfolane and the like.

Many polymer blends exist which are essentially solid or fluid dispersions of two or more polymers in each other. In making these blends, two or more different polymers are dissolved in a solvent such as water, and the solvent is then removed, thus precipitating the polymers. The material thus formed may or may not have any interpolymer hydrogen bonding, but since it is soluble in water any hydrogen bonds in the material are weak enough that water will cleave them. The new class of polymers of the invention have strong interpolymer hydrogen bonds which are not cleaved by water or other polar solvents such as dimethyl sulfoxide or dimethylformamide. Thus, when the gelatin-cellulose polymer of the invention is boiled in water, no solution of the polymer occurs, and neither of the constituent polymers, gelatin or cellulose, is dissolved out by the water. The gelatin-cellulose polymer is similarly unaffected by heating to 100° C. in dimethyl sulfoxide or dimethylformamide. The polymers of this invention retain some of the characteristics of their constituent polymers, but they also exhibit some new properties. For example, the gelatin-cellulose polymer of this invention is swelled by water, as is gelatin, but does not dissolve in water.

It is to be understood that for purposes of this discussion, a compound that will readily form a colloidal suspension, such as gelatin, is regarded as having a high degree of solubility.

A possible explanation for the behavior of the new polymers may be found in the method of forming them and in their structure. When a solution is prepared from a mixture of two or more polymers and an amine oxide of the invention, the hydrogen bond sites of the dissolved constituent polymers are associated with the amine oxide solvent. The polymer chains are free to move in relationship with each other and to associate or not to associate with other polymer chains. This condition exists even when the mixed polymer solutions are cast into films or spun into thin fibers. When the films or fibers are precipitated into a cold nonsolvent for the polymer constituent which is a solvent for the amine oxide, the hydrogen bonds to the amine oxide are interrupted and new polymer-to-polymer hydrogen bonds form. As a result of the random linking of dissimilar constituent polymer units, a new polymer is formed comprising the constituent polymers randomly arranged throughout the new polymer and interjoined by strong interpolymer hydrogen bonding. A postulated structure of the cellulose-gelatin polymer of the invention is schematically illustrated by FIGURE 1. The blocks represent the linear molecules of the constituents cellulose and gelatin which are joined by hydrogen bonds denoted as —H—. As the figure indicates, the molecular arrangement in the hydrogen-bonded polymer is thought to be random.

Hydrogen bonding is a known phenomenon and refers to bonding by interaction between two functional groups which in the present case are in different molecules. One of these functional groups must serve as a proton donor (an acidic group) and the other as an electron donor (a basic group). The proton is usually contributed by a carboxyl, hydroxyl, amine or amide group. Functional groups which may contribute the electron include oxygen in carbonyls, ethers, and hydroxyls, and the nitrogen atom in amines and N-heterocyclic compounds. A hydrogen bond can be generally defined as an interaction between the fuctional group A–H and an atom or group of atoms B in the same or a different molecule when there is evidence of bond formation in which the new bond linking A–H to B is through the H. A and B usually come from the group of elements nitrogen and oxygen. Evidence of this type of bond is usually obtained from molecular weight determinations or from spectroscopic determinations. Compounds containing intermolecular hydrogen bonding as compared to compounds lacking this hydrogen bonding exhibit different physical properties such as higher freezing and boiling points, changed dielectric properties, higher viscosity, modified electronic spectra, and different solubility characteristics. A further discussion of hydrogen bonding may be found in Pimentel and McClellan, "The Hydrogen Bond," W. H. Freeman & Co., San Francisco, 1960.

Because the amine oxides of this invention which are used as solvents for the polymers to be joined will dissolve a wide range of compounds, an almost unlimited number of new polymers can be created by the process of this invention. The constituent polymers can be selected so as to impart to the new interpolymer hydrogen-bonded polymer their most desirable qualities, while having their undesirable qualities negated by other suitably chosen constituent polymers. The new polymers have desirable qualities of their own, which are not shown by the constituent polymers alone, such as extraordinary strength, unusual insolubility, or the ability to absorb water without being dissolved by it.

The polymers described in the invention have varied uses. Some of the polymers are effective as dialysis membranes. Polymers made wholly of natural materials can be used as synthetic skin or as sausage casings. Fibers made from these polymers can be spun into new fabrics, and films cast from them employed as vehicles and supports for photographic emulsions or other materials. Solutions of the polymers of the invention may be coated onto paper (or other fibrous material) to improve the wet and dry strength characteristics of the paper.

The following examples will serve to illustrate the invention but are not to be construed to limit it in any way.

EXAMPLE 1

In a 500 ml. round-bottom flask is placed 150 g. of N-methylmorpholine-N-oxide. The flask is then heated in an oil bath thermostatted at 110° C. The contents of the flask are mechanically stirred while 6 g. of cellulose (Whatman #4 filter paper which has been defibered in a Waring blender) is added in portions over a 5-minute period. Six grams of bone gelatin are swelled overnight in 40 ml. of water and dissolved in 150 ml. of dimethyl sulfoxide. This gelatin solution is added in a stream to the cellulose solution at such a rate to prevent precipitation of the cellulose (about 5 minutes). After stirring for about 15 minutes, a clear, completely compatible dope results. While still hot, the solution is filtered through a Dannley funnel which has a sintered glass disc of 70–100 microns porosity.

Films of this dope are cast on poly(ethylene terephthalate) film support with a coating hopper. The poly(ethylene terephthalate) support and the dope are immediately immersed in a tray of acetonitrile cooled to −10° C. with Dry Ice. The dope immediately sets up to give a film which has good strength and dimensional stability and can be floated off the poly(ethylene terephthalate) support and handled in the solution. This film is subsequently washed three times in fresh acetonitrile, placed on a glass plate and air-dried.

A sample of this film is placed in a beaker of water and boiled on a hot plate for 30 minutes. The physical appearance of the film is unchanged. The water from the breaker is evaporated to dryness on a rotary evaporator and no residue remains, indicating that none of the gelatin is extracted from the film by this process.

Some of the dope is placed in a syringe with a No. 26 needle and ejected through the needle with air pressure into an elongated U-shaped tube filled with cold methanol. The beginning of the fiber is carried by a loop of thread through the U-shaped tube up to an electrically driven takeup reel. The fibers are air-dried and found to have moderate strength with good elasticity when wet with water and no brittleness when dry.

EXAMPLE 2

The procedure of Example 1 is followed using N-methylpiperidine-N-oxide as the solvent for the cellulose. Polymeric film and fibers of the cellulose-gelatin polymer are obtained which have the same properties as those described in Example 1.

EXAMPLE 3

In an apparatus as described in Example 1, 150 g. of N-methylmorpholine-N-oxide is melted. In the liquid amine oxide, 3 g. of cotton linters are dissolved. To this solution is added 150 ml. of dimethyl sulfoxide to reduce the viscosity of the dope. The temperature is lowered from 110° C. to 90° C. and 3 g. of β-amylose is added. A clear solution results after stirring for 30 minutes. This is filtered through a 70–100 micron Dannley funnel, then refiltered through a 4–8 micron Dannley funnel. Films and fibers of this cellulose-starch polymer are prepared as before.

EXAMPLE 4

In an apparatus as described in Example 1, 100 g. of N-methylmorpholine-N-oxide are melted and 3 g. of cotton linters are dissolved in the liquid amine oxide. To this is added a solution of 3 g. of low acetyl poly(vinyl alcohol) in 100 ml. dimethyl sulfoxide. A clear dope results which is filtered and cast onto films of poly(ethylene terephthalate) support or onto paper support. Fibers of the cellulose-poly(vinyl alcohol) polymer cast from this dope are brittle.

EXAMPLE 5

With the oil bath of Example 1 at 100° C., 6 g. of cotton linters are dissolved in 200 g. of N-methylmorpholine-N-oxide. To this solution is added a solution of 6 g. of poly(vinyl pyrrolidone) in 200 ml. of dimethyl sulfoxide. This is stirred 2 hours and then filtered through a 70–100 micron Dannley funnel to give a slightly yellow, clear dope. Crystal-clear films could be prepared by casting the dope on poly(ethylene terephthalate) support and chill-setting in acetonitrile. The infrared spectrum has the characteristic cellulose absorptions, —OH at 3400 cm.$^{-1}$, aliphatic —CH$_2$— at 2850 cm.$^{-1}$ and broad either absorption centered at 1060 cm.$^{-1}$ superimposed on the strong amide carbonyl of the poly(vinylpyrrolidone) at 1660 cm.$^{-1}$. These films of cellulose-poly(vinylpyrrolidone) polymer are quite strong and may be easily handled when dry. Fibers can also be spun from this dope.

EXAMPLE 6

In an apparatus as described in Example 1, 3 g. of cotton linters are dissolved in 100 g. of melted N-methylmorpholine-N-oxide. To this solution is added a solution of 3 g. of poly(vinyl acetate) dissolved in 100 ml. of dimethyl sulfoxide. This mixture is stirred overnight to give a clear dope which is filtered through a Dannley funnel with a 70–100 micron porosity sintered glass disc.

Extremely strong fibers of cellulose-poly(vinyl acetate) polymer can be spun from this dope. Their strength can be increased by drawing them tight or stretching them when drying them over a stream of hot air. Thin films of cellulose-poly(vinyl acetate) polymer are also prepared from this dope by casting on poly(ethylene terephthalate) film support or onto paper.

EXAMPLE 7

In an apparatus as described in Example 1, 3 g. of cotton linters are dissolved in 100 g. of N-methylmorpholine-N-oxide at 95° C.; the mixture is stirred for 20 minutes. Three grams of gum arabic (acacia) are then added and stirring is continued for 30 minutes. The pale, straw-colored solution is filtered through a 60–80 micron porosity sintered glass disc in a Dannley funnel and coated on a paper support or on a poly(ethylene terephthalate) support to give a clear film of cellulose-gum arabic polymer after being extracted with acetonitrile.

EXAMPLE 8

In an apparatus as described in Example 1, 3 g. of cotton linters are dissolved in 100 g. of N-methylmorpholine-N-oxide at 90° C. To this solution is added 3 gr. of a poly(anhydroglucose) dissolved in 100 ml. of dimethyl sulfoxide. After stirring for 30 minutes, a clear compatible dope results and is filtered through a 60–80 micron porosity sintered glass disc in a Dannley funnel. Clear films of the cellulose-poly(anhydroglucose) polymer are prepared from this dope by casting on poly(ethylene terephthalate) support and precipitating in acetonitrile.

EXAMPLE 9

In an apparatus as described in Example 1, 3 g. of cotton linters are dissolved in 100 g. of N-methylmorpholine-N-oxide at 100° C. To this solution is added a solution of 3 g. of poly(diethylaminoethylanhydroglucose) dissolved in 100 ml. of N-methylpyrrolidone. After stirring for 30 minutes, the dope is filtered through a sintered glass funnel and coated on paper or poly(ethylene terephthalate) support. When precipitated in methanol at −10° C., clear strong films result. Strong membranes result when the dope is cast onto teabag stock or onto fused dacron and precipitated.

EXAMPLE 10

The following example illustrates the preparation of a polymer which has derivatives of cellulose and gelatin as constituent polymers.

A solution is prepared from 6 g. of bone gelatin and 6 g. of cotton linters in 300 g. of N-methylmorpholine-N-oxide and 200 ml. of dimethyl sulfoxide. After filtration, about one-half of this solution is placed in a flask thermostated at 85° C. in an oil bath and mechanically stirred with 100 ml. of acrylonitrile for 4 hours. The deep red solution is precipitated into 3 liters of acetone and 1 liter of methanol, washed three times in methanol, and then washed with acetone and ether. After drying in a vacuum dessicator, the product is found to be soluble in dimethyl sulfoxide and to have the infrared absorptions of cyanoethylated products of the original constituents—an —OH absorption at 3400 cm.$^{-1}$ which is broadened due to hydrogen bonding to the gelatin amide, the amide absorption at 1655 cm.$^{-1}$, the sharp nitrile absorption at 2225 cm.$^{-1}$, and the strong cellulose ether absorption at 1070 cm.$^{-1}$.

EXAMPLE 11

The following example illustrates the use of the cellulose poly(vinylpyrrolidone) polymer of the invention as a paper-strengthening agent.

A solution is prepared from 6 g. of cotton linters in 200 g. of N-methylmorpholine-N-oxide melted at 100° C. and 6 g. of poly(vinylpyrrolidone) in 100 ml. of dimethyl sulfoxide. The solution is filtered through a Dannley funnel to ensure homogeneity. The clear dope which results is coated on a piece of Whatman #4 filter paper with a 0.010 in. coating knife. After coating, the paper is heated to 120° C. over a hot air stream for 2 minutes, then immersed in methanol to remove the solvents and dried. When saturated with water, the untreated paper has a Minden burst strength of 0 p.s.i. and when dry 12 p.s.i. The treated paper has a Minden burst strength of 92 p.s.i. when saturated with water and a dry strength of 95 p.s.i. Thus, the coated paper has the very unusual property of almost equivalent wet and dry strength.

The invention has been described in detail with particular reference to preferred embodiments thereof, but it will be understood that variations and modifications can be effected within the spirit and scope of the invention.

What is claimed is:

1. A process comprising the steps of (1) contacting at least two different natural or synthetic polymeric compounds which are characterized by hydrogen bonding groups, with a cyclic mono(N-methylamine-N-oxide) having the formula:

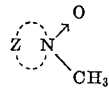

wherein Z represents the atoms necessary to complete a saturated heterocyclic ring and (2) precipitating said polymeric compounds together.

2. The process of claim 1 wherein one of said polymers is cellulose.

3. The process of claim 1 wherein one of said polymer compounds is cellulose and the other is a member from the group of gelatin, starch, poly(vinyl alcohol), poly(vinylpyrrolidone), poly(vinyl acetate), gum arabic, poly(anhydroglucose) and poly(diethylaminoethylanhydroglucose).

4. The process of claim 1 wherein said cyclic mono(N-methylamine-N-oxide) is N-methylmorpholine-N-oxide, N-methylpiperidine-N-oxide, N-methylpyrrolidine-N-oxide or N-methylazacycloheptane-N-oxide.

5. The process of claim 1 wherein said polymeric compounds are precipitated with a liquid which is a nonsolvent for all of said polymers.

6. A process according to claim 1 wherein said polymeric compounds form a solution with said cyclic mono(N-methylamine-N-oxide).

7. The process of claim 1 wherein said polymeric compounds are additionally contacted with a diluent from the group of dimethyl sulfoxide, N-methylpyrrolidone or sulfolane prior to said precipitation of said polymeric compounds.

8. A process according to claim 7 wherein at least one of said polymeric compounds is contacted with said diluent prior to being contacted with said cyclic mono(N-methylamine-N-oxide).

9. A process according to claim 1 wherein said cyclic mono(N-methylamine-N-oxide) is N-methylmorpholine-N-oxide.

10. A process according to claim 1 wherein said cyclic mono(N-methylamine-N-oxide) is N-methylpiperidene-N-oxide.

11. A process according to claim 1 wherein said cyclic mono(N-methylamine-N-oxide) is N-methylpyrrolidone-N-oxide.

12. A process according to claim 1 wherein at least one of said polymeric compounds contains oxygen atoms.

13. A process according to claim 1 wherein at least one of said polymeric compounds contains nitrogen atoms.

14. A process according to claim 1 wherein said polymeric compounds contain atoms from Groups V-A or VI-A of the Periodic Table.

15. A process according to claim 1 wherein said polymeric compounds are polysaccharides or polymeric proteins.

16. A process comprising the steps of (1) contacting cellulose and at least one other natural or synthetic polymeric material which is characterized by hydrogen bonding groups with a cyclic mono(N-methylamine-N-oxide) having the formula:

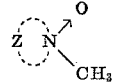

wherein Z represents the atoms necessary to complete a saturated heterocyclic ring and (2) precipitating said polymeric materials together.

17. A composition formed by the process of claim 1.
18. A composition formed by the process of claim 16.

References Cited
UNITED STATES PATENTS

| | | | |
|---|---|---|---|
| 3,447,956 | 6/1969 | Johnson | 117—154 |
| 3,447,939 | 6/1969 | Johnson | 106—135 |
| 3,236,669 | 2/1966 | Williams | 106—163 |
| 2,757,148 | 7/1956 | Heritage | 260—17.2 |
| 2,060,568 | 11/1936 | Graenacher et al. | 8—20 |
| 1,943,176 | 1/1934 | Graenacher | 260—100 |
| 1,158,400 | 10/1915 | Cohoe et al. | 99—176 |

JULIUS FROME, Primary Examiner

T. MORRIS, Assistant Examiner

U.S. Cl. X.R.

106—126, 157, 162, 205, 210; 260—17; 117—138.8